United States Patent [19]

Lulay

[11] Patent Number: 4,928,548
[45] Date of Patent: May 29, 1990

[54] ARRANGEMENT FOR CONTINUOUSLY COMPENSATING FOR UNBALANCE ON A ROTARY MEMBER

[75] Inventor: Eugen Lulay, Bensheim, Fed. Rep. of Germany

[73] Assignee: Hofmann Werkstatt-Technik GmbH, Pfungstadt, Fed. Rep. of Germany

[21] Appl. No.: 427,486

[22] Filed: Oct. 27, 1989

[30] Foreign Application Priority Data

Nov. 3, 1988 [DE] Fed. Rep. of Germany ....... 3837373

[51] Int. Cl.⁵ ............................................. F16F 15/22
[52] U.S. Cl. .................................... 74/573 F; 51/169
[58] Field of Search ..................... 74/573 F, 573 R; 51/169

[56] References Cited

U.S. PATENT DOCUMENTS 4,281,563  8/1981  Favrot ............................. 74/573 F

FOREIGN PATENT DOCUMENTS 2852376  7/1980  Fed. Rep. of Germany .... 74/573 F
3535717  4/1986  Fed. Rep. of Germany .... 74/573 R
 924779  5/1963  United Kingdom ............. 74/573 R Primary Examiner—Rodney M. Lindsey
Attorney, Agent, or Firm—Cushman, Darby & Cushman

[57] ABSTRACT

An arrangement for continuously compensating for unbalance of a rotary member such as a grinding wheel comprises an annular container which is adapted to be coaxially secured to the rotary member to be balanced. The container is subdivided in its circumferential direction into a plurality of balancing chambers which are accordingly disposed at different angular positions in relation to the rotary member. A compensating liquid can be introduced into the respective balancing chambers from the exterior thereof to provide an unbalance compensating effect. Associated with each of the balancing chambers is a respective chamber emptying valve which for the purpose of emptying compensating liquid from the respective chamber can be actuated by an actuating piston arranged coaxially with respect to the container and axially displaceable by a drive controlled from the exterior of the arrangement. The actuating piston actuates valve displacement elements which are radially displaceable for opening and closing the chamber emptying valves, by the axial displacement of the actuating piston.

28 Claims, 2 Drawing Sheets

4,928,548

ARRANGEMENT FOR CONTINUOUSLY COMPENSATING FOR UNBALANCE ON A ROTARY MEMBER

BACKGROUND OF THE INVENTION

To provide for continuous compensation for unbalance of a rotary member such as a grinding wheel, for example during on-going operation thereof, it is possible to provide an arrangement comprising an annular container which is coaxially fixed to the rotary member to be balanced. The annular container is subdivided in its circumferential direction into a plurality of balancing chambers at different angular positions, into which a compensating medium such as a fluid can be selectively introduced from the exterior of the annular container, to provide for compensation in respect of unbalance of the rotary member. However, in operation of such an arrangement on a rotary member such as a balancing wheel, more an more compensating fluid is introduced into the balancing chambers for each respective unbalance compensating operation which has to be carried out, so that the balancing chambers become progressively filled to such an extent that it is ultimately no longer possible to provide an unbalance compensating effect. In that case the balancing chambers have to be emptied again. Provided for that purpose are chamber emptying valves which are operatively associated with the respective balancing chambers. The chamber emptying valves are actuated by an actuating member in the form of an annular deflector plate which acts on and thus actuates the respective chamber emptying valves by way of spring-loaded, axially disposed valve displacement elements which are in the form of push rod members. The deflector plate is actuated by nozzles which are disposed in directly opposite relationship to the plate, in an annular duct, and through which a pressure fluid can be directed on to the plate. In order to produce simultaneous displacement of the plate over the entire circumference thereof, that arrangement requires a comparatively large number of nozzles for directing pressure fluid on to the plate around the circumferential extent thereof. In addition, to provide for transmission of the control movement of the plate to the valve members of the chamber emptying valves, besides the spring-loaded, axially displaceable push rod members acting as valve displacement members to operate the chamber emptying valves, that arrangement also has single-arm levers which are associated with respective ones of the chamber emptying valves and which are actuated by virtue of the axial movement of the push rod members. When the levers are pivoted, they displace the respective valve members of the chamber emptying valves which are in the form of non-return or check valves. Therefore, to provide for the simultaneous opening of all the chamber emptying valves, the assembly requires a relatively large number of individual components which means that the amount of work involved in final assembly of the system is high.

SUMMARY OF THE INVENTION

An object of the present invention is to provide an arrangement for continuously compensating for unbalance of a rotary member such as a grinding wheel, which is of a substantially simple construction while being reliable in operation.

Another object of the present invention is to provide an arrangement for continuously compensating for unbalance of a rotary member, which provides for unbalance compensation by the introduction of a fluid into balancing chambers and wherein the balancing chambers can be readily emptied of fluid by a single actuating operation.

Still another object of the present invention is to provide an arrangement for continuously compensating for unbalance of a grinding wheel by the introduction of a balancing fluid into a plurality of balancing chambers, wherein the balancing chambers can be emptied by actuation of chamber emptying valves in a single operation by means of a simple and reliable mechanism.

In accordance with the principles of the present invention, these and other objects are achieved by an arrangement for continuously compensating for unbalance of a rotary member such as a grinding wheel, comprising an annular container adapted to be secured to the rotary member to be balanced in coaxial relationship therewith. The container is subdivided in its circumferential direction into a plurality of balancing chambers which are thus disposed at different angular positions in relation to the grinding wheel. A compensating medium which is capable of flow, such as a liquid, can be introduced into the balancing chambers from the outside of the container to provide for an unbalance compensating operation. Operatively associated with each of the balancing chambers are respective chamber emptying valves which are arranged outside the axis of rotation of the rotary member and therewith the container and which are closed in normal operation. When the balancing chambers are filled with balancing fluid, the chamber emptying valves can be opened from the outside of the arrangement by an actuating means by way of valve displacement members which engage the respective valve members of the chamber emptying valves, to provide for emptying of the associated balancing chambers. The actuating means comprises an actuating piston which is disposed in coaxial relationship with the annular container and which is axially displaceable by a drive means which is controlled from the outside of the arrangement. The axial displacement of the actuating piston causes radial displacement of the valve displacement elements to provide for opening and closing of the chamber emptying valves.

As will be seen in greater detail hereinafter therefore the present invention uses an actuating means which is disposed concentrically with respect to the rotary member to be balanced and the annular container secured thereto and which acts on the valve displacement elements to move them radially to actuate the chamber emptying valves. The valve displacement elements thus extend generally in a radial direction from the actuating means to the respective chamber emptying valves. That design configuration not only provides a compact arrangement but it also gives a reduction in the number of individual components used as the actuating piston forming part of the actuating means is so designed that it moves the valve displacement elements in a radial direction. The valve members of the chamber emptying valves, which are operated by the valve displacement elements, are preferably also moved in a radial direction for opening and closing the respective valves.

In a preferred feature of the invention, to provide for the radial movement of the valve displacement elements which are preferably in the form of simple elongate members such as pins or rods, the actuating piston has engagement surfaces which extend inclinedly relative to the axial direction of the arrangement and thus the axis of rotation of the rotary member and the container. The engagement surfaces on the actuating piston are in sliding engagement with the valve displacement elements to provide for radial displacement thereof.

Preferably the valve displacement elements may have suitably adapted sliding surfaces which are in sliding engagement with the engagement surfaces of the actuating piston.

Depending on the position of the actuating piston, the valve displacement elements are displaced radially outwardly or radially inwardly, and the associated chamber emptying valve can thus be opened or closed, in dependence on the respective positions of the valve displacement elements.

Preferably, each valve displacement element may be provided with first and second sliding surfaces which are engaged by first and second inclined engagement surfaces of the actuating piston. The sliding surfaces of the respective valve displacement elements and the engagement surfaces of the actuating piston preferably extend parallel and are disposed on respective sides of a respective valve displacement element in the above-indicated inclined arrangement relative to the axial direction or the axis of rotation of the arrangement.

In another embodiment of the invention the elongate valve displacement members may be disposed in guides of a simple configuration in a part of the body of the annular container, more especially in a wall of the container, and preferably in the ribs or partition walls between the respective chambers of the container. The valve displacement elements may thus to radially displaceably arranged in bores extending in the radial direction in the body of the container; when the valve displacement elements are in the form of circular rods or pins, the bores may be simple cylindrical bores in the body of the container.

Preferably, in an arrangement in which the chamber emptying valves have valve members which are displaceable in a radial direction, the radially outer ends of the valve displacement elements may themselves be in the form of valve members which can be moved into the closed position and the opened position of the respective valve, by virtue of the actuating effect of the actuating piston.

In a preferred embodiment of the invention, displacement of the actuating piston and therewith also the valve members of the chamber emptying valves is effected in particular when opening the valves against a return force which can be provided by means of one or more return springs which may engage the actuating piston and/or the respective valve displacement elements and/or the valve members of the respective valves. The return springs produce a return force urging the respective chamber emptying valves towards the closed position.

In a preferred embodiment the actuating piston may have two forms of engagement surfaces which are inclined with respect to the axis of rotation of the arrangement and which are in operative engagement with the valve displacement elements of the respective valves. In that arrangement, the first engagement surface or surfaces are operative in the direction of opening of the respective chamber emptying valves and are preferably directed towards the axis of rotation of the arrangement while the other engagement surface or surfaces are directed away from the axis of rotation of the arrangement and are thus operative in the direction of closing of the chamber emptying valves.

The compensating medium used is preferably a compensating liquid, in particular water. The compensating medium may be supplied to the annular chamber for an unbalance compensating effect both from the inward side of the annular container, as for example in German laid-open application (DE-OS) No. 35 35 717, and also from the face of the annular container as for example in German laid-open application (DE-OS) No. 23 57 629.

Further objects, features and advantages of the present invention will be apparent from the following description of preferred embodiments thereof.

DESCRIPTION OF PREFERRED EMBODIMENTS

In the following description and in the accompanying drawings comprising FIGS. 1 and 2 referring thereto, components which produce the same effect or have the same action and which are used in both of the illustrated embodiments are accordingly denoted by the same references.

Figure 1:
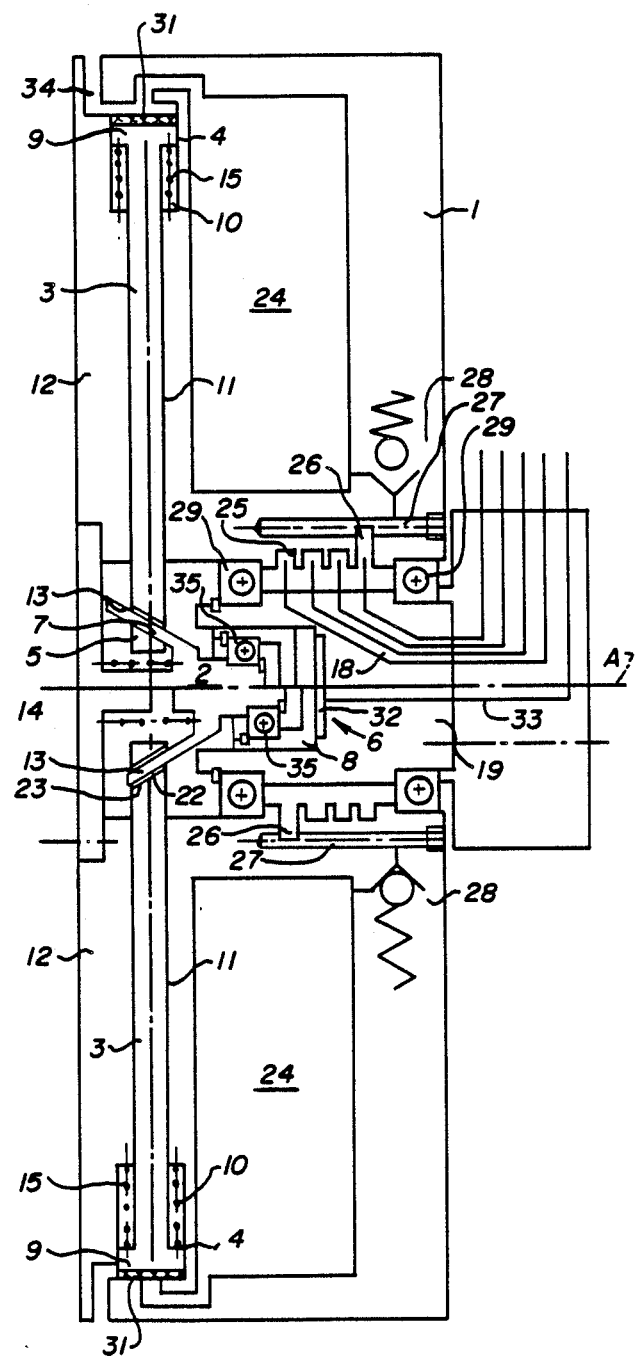
FIG. 1 shows a first embodiment of an arrangement according to the present invention.
Figure 2:
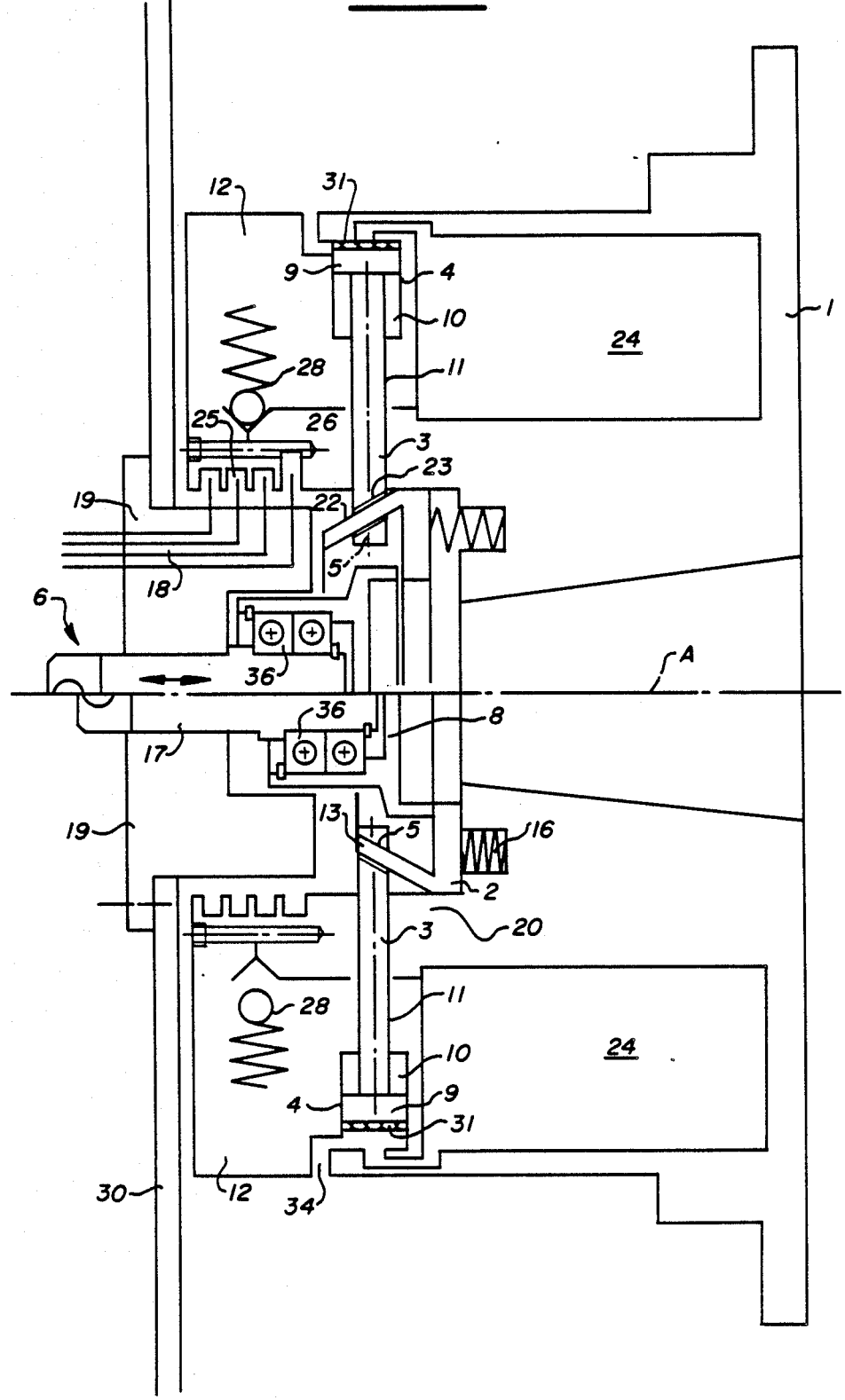
FIG. 2 shows a second embodiment of the arrangement.

Referring firstly to FIGS. 1 and 2 in combination, the unbalance compensating arrangement illustrated in each of FIGS. 1 and 2 to provide for continuous compensation for unbalance of a rotary member (not shown) which may be for example a grinding wheel comprises a generally annular container 1 which can be suitably secured to the rotary member to be balanced in coaxial relationship therewith, for example by means of a flange mounting. In its interior the annular container 1 has a plurality of balancing chambers 24 which are arranged at different angular positions in the circumferential direction of the annular container 1 and thus also the arrangement of the invention and the rotary member to which it is secured in use thereof. To carry out an unbalance compensating operation, a compensating medium which is capable of flow, more especially for example water, is fed to the balancing chambers 24. The arrangement may have for example four or even more balancing chambers 24.

In both of the embodiments shown in FIGS. 1 and 2, the compensating medium is supplied to the chambers 24 in the container 1 from the inward side of the container 1 by way of a suitable feed means indicated generally at 18 in FIGS. 1 and 2. The feed means 18 has liquid feed ducts or passages which are formed in a mounting block 19. As can be seen from FIG. 1, the passages comprise a portion extending parallel to the axis of rotation A which is common to the annular container 1 and the rotary member to be balanced, a second portion which extends at an inclined angle to the axis of rotation A in an outward direction away from same and a third portion which then extends normal to the axis of rotation A and which is directed into circumferentially extending grooves 25 provided at the radially inward side of the annular container 1. In FIG. 2 the ducts or passages comprise a first portion extending parallel to the axis of rotation A and a second portion extending normal thereto, into the grooves 25.

The grooves 25 in both FIGS. 1 and 2 have openings 26 which are communicated with the respectively associated balancing chambers 24 by way of communicating ducts 27 and valves 28 which in particular can be in the form of non-return or check valves. The openings 26, the communicating ducts 27 and the valves 28 which are associated with respective ones of the balancing chambers 24 are disposed in different angular positions distributed around the circumference of the annular container 1. In the embodiment illustrated in FIG. 1 the circumferentially extending grooves 25, the openings 26 and the communicating ducts 27 are arranged in the inner annular portion of the annular container 1 while in the embodiment shown in FIG. 2 the above-indicated components together with the valves 28 are disposed in an end or face portion of the body 12 of the annular container 1.

In the embodiment shown in FIG. 1, the mounting block 19 in which, as will be described hereinafter, a drive means 6 and an actuating piston 2 are mounted, is fitted into the interior of the annular configuration of the container 1. The mounting block 19 is fitted in the annular container 1 by means of rolling bearing assemblies as diagrammatically indicated at 29. The annular container 1 is thus mounted rotatably relative to the block 19 by means of the rolling bearing assemblies 29.

In the embodiment shown in FIG. 2 the mounting block 19 is fixed to an outer cover portion 30 of the arrangement and projects into the central space in the end portion of the body 12 of the container. In this embodiment also the block 19 accommodates a drive means 6 for an actuating piston 2, but in the FIG. 2 embodiment the actuating piston 2 is mounted displaceably outside the mounting block 19 in the body 12 of the annular container 1, as will be described in greater detail hereinafter.

Operatively associated with each of the balancing chambers 24 is a respective chamber emptying valve 4 which is closed in normal operation involving a balancing effect. In the lower part of FIG. 1, the chamber emptying valve 4 is shown in a closed position while in the upper part of FIG. 1 the chamber emptying valve 4 is illustrated in the open position. Conversely, the lower part of FIG. 2 shows the chamber emptying valve 4 in the open position while the upper part of FIG. 2 shows the chamber emptying valve 4 in the closed position.

In both the illustrated embodiments, the radially outward ends of valve displacement elements 3 which extend in a generally radial array and which are of a rod-like or pin-like configuration form respective valve members 9. The valve members 9 are formed by the radially outward ends of the respective valve displacement elements 3 being enlarged in diameter to form a disc-like configuration, and carry a valve seat material as indicated at 31 at their respective radially outwardly facing face. For actuation of the valve displacement elements 3, that is to say to move the valve displacement elements 3 in a radial direction, the arrangement includes an actuating means comprising an actuating piston 2 which is disposed in coaxial relationship with the annular container 1. Formed on the actuating piston 2 are engagement fingers 13 which are disposed in spaced relationship around the periphery of the piston 2 and which have engagement surfaces 5 and 22 at respective sides thereof. Each two engagement fingers 13 are in operative engagement with a respective radially inwardly disposed end portion of the associated valve displacement element 3. The engagement surfaces 5 and 22 on the engagement fingers 13 carried by the actuating piston 2 extend inclinedly relative to the axis of rotation A. The engagement surfaces 5 are directed towards the axis of rotation A, that is to say they are disposed on the radially inwardly facing sides of the respective fingers 13, while the engagement surfaces 22 are directed away from the axis of rotation A and are thus disposed on the radially outwardly facing surfaces of the respective fingers 13.

Each side of each valve displacement element 3 has a respective groove which is provided in the radially inwardly disposed end portion of the valve displacement element 3. The grooves extend inclinedly with respect to the axis of rotation A and the engagement fingers 13 engage into respective ones of the grooves. The engagement grooves are defined by sliding surfaces as indicated at 7 and 23 in FIGS. 1 and 2, the sliding surfaces 7 and 23 also extending inclinedly with respect to the axis of rotation A. More specifically, the sliding surfaces 7 and 23 on the valve displacement elements 3 extend inclinedly relative to the axis of rotation A at the same angle as the engagement surfaces 5 and 23 on the actuating piston 2. Of the engagement surfaces 5 and 23, at least the respective surfaces 5 which face towards the axis of rotation A can come into engagement with the associated sliding surfaces 7 on respective ones of the valve displacement elements 3, more particularly when the valve displacement elements 3 and therewith the valve members 9 carried or formed thereon are moved radially towards the axis of rotation A.

As mentioned above, the arrangement in accordance with the present invention has an actuating means comprising an actuating piston 2 and a drive means 6 for actuation of the valve displacement elements 3 and the respective valve members 9. In the embodiment illustrated in FIG. 1 the actuating means is disposed in the mounting block 19. To provide for the drive for the actuating piston 2 against a return force produced by return springs 14 and 15, the drive means 6 has a working piston 8 which is axially slidably mounted in the mounting block 19. A pressure fluid can be introduced into a working chamber 32 which is disposed to the right of the working piston 8 in FIG. 1, by way of a hydraulic conduit 33, so that the working piston 8 and therewith the actuating piston 2 are displaced towards the left in FIG. 1, from the normal position towards the right in FIG. 1, as illustrated in the lower half of FIG. 1, inwardly towards the rotary member to be balanced, against the force of the return spring 14 which acts on the actuating piston 2, and also against the force of the respective return springs 15 which act on the valve members 9 to urge them radially outwardly. As a result of that actuation, the actuating piston 2 takes up the position towards the left as shown in FIG. 1 above the axis of rotation A, in which case the engagement surfaces 5 which face towards the axis of rotation A come into sliding engagement with the engagement surfaces 7 of the valve displacement elements 3. In that situation, by virtue of the inclined arrangement of the engagement surfaces 5 and the sliding surfaces 7 relative to the direction of displacement of the actuating piston 2, the valve displacement elements 3 and therewith the respective valve members 9 of the chamber emptying valves 4 are drawn radially inwardly towards the axis of rotation A into the opened position of the valves, as illustrated in the upper half of FIG. 1. In that position the balancing chambers 24 can be emptied of fluid therein, by rotating the arrangement. The centrifugal force which is produced in that situation causes the compensating liquid which is contained in the balancing chambers 24 to escape through the normally closed discharge passage 34 operatively associated with each chamber emptying valve 4.

After conclusion of the emptying operation, the pressure fluid is discharged from the working chamber 32 at the right of the working piston 8 in FIG. 1 through the hydraulic conduit 33 so that the working piston 8 and therewith the actuating piston 2 are displaced axially towards the right in FIG. 1 into the position shown in the lower half of FIG. 1. That movement is assisted and promoted by the return force of the return spring 14, and the radially outwardly directed movement of the valve displacement elements 3 and the valve members 9 into the closed position of the chamber emptying valves 4 as shown in the lower half of FIG. 1, such movement being produced by the movement of the actuating piston 2, is assisted by the respective return springs 15 which act on the valve members 9. As in the embodiment illustrated in FIG. 1 the outwardly directed engagement surfaces 22 on the actuating piston 2 come into engagement with the associated sliding surfaces 23 on the valve displacement elements 3, the radially outwardly directed movement of the valve displacement elements 3 is produced by the co-operation of the engagement surfaces 22 and the sliding surfaces 23. The function of the return springs 15 is primarily to compensate for any mechanical clearances between the individual components of the assembly and to apply a well-defined static force to the chamber emptying valves. In the closed position the discharge passages 34 associated with the respective chamber emptying valve 9 are then closed so that no compensating liquid can then escape from the balancing chambers 24.

In order for the rod-like or pin-like valve displacement elements 3 in FIG. 1 to be satisfactorily guided, the body 12 of the container 1 has radially extending bores acting as guides as indicated at 11 for the valve displacement elements 3 which are thus radially slidably guided therein. To provide for satisfactory guidance of the valve members 9, suitably shaped valve housing 10 are disposed in the body 12 of the annular container 1. In the FIG. 1 embodiment the valve displacement elements 3 and the chamber emptying valves 4 are disposed in the wall portion of the annular container 1 which is towards the rotary member to be balanced (not shown), and are preferably provided in the rib portions or partitions between the chambers 24 of the annular container 1.

In normal operation, that is to say when the rotary member to be balanced is rotating, the annular container 1 also rotates therewith and any unbalance which occurs at the rotary member in that phase of operation is detected by means of an unbalance measuring device (not shown), and a control arrangement (not shown) is then actuated in dependence on the unbalance measurement result. The control arrangement provides that suitable amounts of compensating liquid corresponding to the unbalance detected are supplied by way of the feed conduits of the feed means 18 into the appropriate balancing chambers 24. During that phase of operation, the respective valves 28 which can be in the form of check valves which are opened by centrifugal force are in fact opened so that the respective required amount of compensating liquid can be passed to the corresponding balancing chamber or chambers 24. When operation of the arrangement and the rotary member to be balanced is stopped, the valves 28 close, due to the absence of centrifugal force for actuating same, thus providing a closed circuit so that the balanced condition is retained for re-commencing operation of the system.

When the balancing chambers 24 are filled with compensating fluid, the above-described emptying operation has to be carried out.

As, while the system is in operation, that is to say while the annular container 1 of the arrangement according to the invention is rotating, the actuating piston 2 must also rotate with the valve displacement elements 3, the actuating piston 2 of the embodiment shown in FIG. 1 is mounted by way of rolling bearing assemblies 35 in the working piston 8 which is of a cup-like configuration. That design provides that the actuating piston 2 can rotate relative to the working piston 8 and the mounting block 19 which does not rotate. As already mentioned, the annular container 1 is supported rotatably relative to the block 19, at its inward annular portion, by way of the rolling bearing assemblies 29.

In the embodiment shown in FIG. 2, the closed position of the chamber emptying valves 4 is illustrated in the upper half of FIG. 2 while the open position of the chamber emptying valves 4 is illustrated in the lower half of FIG. 2. The mode of operation of the FIG. 2 embodiment is in substance the same as that of the embodiment shown in FIG. 1. In the FIG. 2 construction however the actuating piston 2 is mounted in the inner annular portion of the annular container 1. The drive means 6 comprises a piston rod 17 which can be automatically or manually actuated from the exterior of the arrangement and which can be displaced with a reciprocating motion along the axis of rotation A. the piston rod 17 is mounted in the mounting block 19 which is fixed to an outer cover means 30 of the arrangement of the invention. The working piston 8 is mounted rotatably about the piston rod 17, by means of rolling bearing assemblies indicated at 36. The working piston 8 is reciprocated by actuation of the piston rod 17.

In normal operation the piston rod 17 is in the left-hand position shown in the upper half of FIG. 2. In that position the chamber emptying valves 4 are closed. When the annular container 1 rotates, together with the rotary member to be balanced, the effect of centrifugal force means that the valves 28 open so that if necessary, when unbalance occurs on the rotary member to be balanced, compensating liquid can be supplied to the appropriate balancing chambers 24. The compensating liquid is supplied by way of feed conduits of the feed means 18 which are directed into the respective annular grooves 25, and by way of the corresponding openings in the annular grooves 25 and by way of the valves 28 which are opened by the effect of centrifugal force, to the respective balancing chambers 24.

When the balancing chambers 24 are filled so that it is no longer possible to compensate for any further unbalance, the piston rod 17 is moved in the axial direction towards the right in FIG. 2, towards the rotary member to be balanced. With that movement, the working piston 8 is also move towards the right and urges the actuating piston 2 which is axially slidable in an inner annular portion 20 of the annular container 1, against the return force of a return spring 16, into the right-hand position shown in the lower half of FIG. 2. In that movement, the engagement surfaces 5 which are provided on the actuating piston 2 or more specifically on the engagement fingers 13 thereof and which extend inclinedly with respect to the axis of rotation A come into engagement with the corresponding sliding surfaces 7 on the valve displacement elements 3. As a result of such engagement, the valve displacement elements 3 and the valve members 9 connected thereto are drawn radially inwardly towards the axis of rotation A. As a result, the chamber emptying valves 4 are opened, as shown in the lower half of FIG. 2. The compensating liquid in the balancing chambers 24 can then be discharged therefrom through the discharge passages 34 due to the effect of centrifugal force when the annular container 1 is rotated.

After the operation of emptying the balancing chambers 24 has been concluded, the piston rod 17 is moved towards the left again and the return force of the return springs 16 also causes the actuating piston 2 to be moved into its left-hand position as shown in the upper half of FIG. 2. When that happens the chamber emptying valves 4 are closed again. When that closing movement takes place, the inclined engagement surfaces 22 on the actuating piston 2, which face radially outwardly away from the axis of rotation A, are pressed against the sliding surfaces 23 on the valve displacement elements 3, which are inclined in the same manner, so that the valve members 9 are moved into their closed positions, due to the return force of the return springs 16 acting on the actuating piston 2. As in the embodiment shown in FIG. 1, the FIG. 2 arrangement may also have return springs which act on the respective valve members 9 and which urge them towards their closed position.

It will be appreciated that the above-described embodiments in accordance with the present invention have been set forth solely by way of example and illustration of the principles of the invention and that various modifications and alterations may be made therein without thereby departing from the spirit and scope of the invention.

I claim:

1. An arrangement for continuously compensating for unbalance of a rotary member, comprising: an annular container adapted to be secured to the rotary member in coaxial relationship therewith and subdivided in its circumferential direction into a plurality of balancing chambers at different angular positions; means for introducing a compensating medium which is capable of flow into the balancing chambers for an unbalance compensating operation; chamber emptying valves operatively associated with respective ones of the balancing chambers and arranged outside the axis of rotation of the arrangement, the chamber emptying valves being closed in normal operation of the arrangement; and an actuating means for opening the chamber emptying valves when the balancing chambers are filled with compensating medium, for emptying of the associated balancing chambers, the actuating means comprising an actuating piston which is arranged coaxially with respect to the annular container and which is axially displaceable relative thereto, a drive means which is controlled from the exterior of the arrangement for displacing the actuating piston, and valve displacement elements which extend radially from the actuating piston and are displaceable radially by the actuating piston upon said axial displacement thereof, for actuating the chamber emptying valves.

2. An arrangement as set forth in claim 1 wherein said actuating piston has engagement surface means which extend inclinedly relative to the axial direction of displacement of the actuating piston and which are in sliding engagement with said valve displacement elements to produce said radial displacement thereof.

3. An arrangement as set forth in claim 2 wherein said valve displacement elements have inclined sliding surface means co-operable with said engagement surface means on said actuating piston.

4. An arrangement as set forth in claim 2 wherein said actuating piston has a plurality of engagement finger portions and wherein said engagement surface means comprises a plurality of engagement surfaces disposed on respective ones of said engagement finger portions.

5. An arrangement as set forth in claim 4 wherein first and second engagement surfaces on said actuating piston are operatively associated with each said valve displacement element, the valve displacement element extending in a radial direction between the associated engagement surfaces.

6. An arrangement as set forth in claim 1 wherein said valve displacement elements extend radially outwardly from said actuating piston.

7. An arrangement as set forth in claim 1 wherein each said chamber emptying valve comprises a valve housing and a valve member which is displaceable in said valve housing for opening and closing the respective valve, the valve member being formed by a radially outward end portion of the operatively associated valve displacement element.

8. An arrangement as set forth in claim 7 wherein each said chamber emptying valve further includes a guide for the respective valve displacement element, and wherein the valve housing and the guide of each said chamber emptying valve are disposed in a part of a body portion of said annular container.

9. An arrangement as set forth in claim 1 wherein said valve displacement elements are in the form of rods.

10. An arrangement as set forth in claim 1 including a means for applying a return force to said actuating piston in opposition to axial displacement thereof by said drive means.

11. An arrangement as set forth in claim 10 wherein said means for applying a return force is operative in the direction of closure of said chamber emptying valves and said actuating piston is displaceable in the direction of opening of said chamber emptying valves.

12. An arrangement as set forth in claim 2 wherein said engagement surface means on said actuating piston face towards the axis of rotation of the arrangement.

13. An arrangement as set forth in claim 10 wherein said means for applying a return force comprises at least one return spring adapted to displace said actuating piston.

14. An arrangement as set forth in claim 10 wherein said means for applying a return force comprises at least one return spring adapted to displace the valve displacement elements.

15. An arrangement as set forth in claim 1 wherein said drive means includes a piston rod for axially displacing said actuating piston.

16. An arrangement as set forth in claim 1 wherein said drive means includes means for axially displacing said actuating piston by a pressure fluid.

17. An arrangement as set forth in claim 16 wherein said drive means includes a working piston adapted to displace said actuating piston.

18. An arrangement as set forth in claim 1 wherein said actuating means is disposed in the annular interior of said annular container.

19. An arrangement as set forth in claim 1 and further including means for feeding said compensating medium to the respective balancing chambers, said feed means being disposed at the inward side of the annular container, the drive means and the feed means being disposed in the annular interior of the annular container.

20. An arrangement as set forth in claim 1 wherein said drive means and said actuating piston are disposed in a mounting block adapted to be fitted into the annular interior of the annular container.

21. An arrangement as set forth in claim 20 wherein said actuating piston is mounted rotatably relative to said mounting block.

22. An arrangement as set forth in claim 21 wherein said drive means comprises a working piston adapted to displace said actuating piston, and a piston rod on which said working piston is rotatably mounted, said piston rod being axially displaceable from the exterior of the arrangement.

23. An arrangement as set forth in claim 20 and further including a working piston axially displaceably mounted in the mounting block, the actuating piston being mounted rotatably on said working piston.

24. An arrangement as set forth in claim 1 wherein said annular container includes an annular inner portion in which said actuating piston is axially displaceably mounted.

25. An arrangement as set forth in claim 1 wherein said actuating piston is adapted to open said chamber emptying valves when the actuating piston is moved axially towards the rotary member to be balanced and to close said chamber emptying valves in the opposite axial direction of movement of the actuating piston.

26. An arrangement as set forth in claim 1 wherein said actuating piston has engagement surface means which extend inclinedly with respect to the axis of rotation of the arrangement and which face away from same, and wherein said valve displacement elements have correspondingly formed sliding surface means which are slidably engaged by said engagement surface means on said actuating piston.

27. An arrangement as set forth in claim 26 wherein said actuating piston has engagement surface means which extend inclinedly with respect to the axis of rotation of the arrangement and which face towards said axis of rotation, the engagement surface means which face towards the axis of rotation and the engagement surface means which face away from the axis of rotation extending parallel to each other.

28. An arrangement for compensating for unbalance of a rotary member, comprising: an annular chamber means adapted to be mounted in fixed coaxial relationship with the rotary member and providing a plurality of mutually separate chambers which are disposed in succession in its circumferential direction; means for introducing a fluid compensating medium into the respective balancing chambers to produce an unbalance-compensating effect; chamber emptying valves operatively associated with respective ones of the chambers at radially outward locations on the respective chambers, the chamber emptying valves being closed in normal operation of the arrangement; and an actuating means for opening the chamber emptying valves, for emptying of compensating medium from the associated chambers, the actuating means comprising an actuating member which is arranged coaxially and axially displaceably with respect to the annular chamber means, the actuating member having actuating cam surface means, a drive means for axially displacing the actuating member, and valve elements for actuating the chamber emptying valves, which have surface portions co-operable with the actuating cam surface means on the actuating member whereby axial displacement of said actuating member produces radial displacement of said valve displacement elements for joint actuation of said valves.

* * * * *